United States Patent [19]

Levilain

[11] Patent Number: 4,894,754
[45] Date of Patent: Jan. 16, 1990

[54] UNIT FOR FIXING AND PIVOTING AN OPTICAL ASSEMBLY

[75] Inventor: Alain Levilain, Paris, France

[73] Assignee: Valeo Vision, Bobigny Cedex, France

[21] Appl. No.: 284,057

[22] Filed: Dec. 12, 1988

[30] Foreign Application Priority Data

Dec. 14, 1987 [FR] France ................. 87 17407

[51] Int. Cl.[4] ............ B60Q 1/06; F21V 3/18
[52] U.S. Cl. ........................ 362/66; 362/289; 362/421; 248/288.3; 403/71; 403/140; 403/141
[58] Field of Search ............ 362/61, 80, 66, 287, 362/421, 69, 70, 269, 273, 285, 289, 427; 248/288.3, 181; 403/71, 135, 140, 141

[56] References Cited

U.S. PATENT DOCUMENTS

| | | | |
|---|---|---|---|
| 4,318,161 | 3/1982 | Shanks . | |
| 4,318,162 | 3/1982 | Sip ........................ | 362/226 |
| 4,552,480 | 11/1985 | McIntyre ............... | 403/71 X |
| 4,689,725 | 8/1987 | Saijo et al. ............ | 362/66 |
| 4,707,771 | 11/1987 | Van Duyn et al. ..... | 362/66 |
| 4,722,029 | 1/1988 | Ahle et al. .............. | 362/66 |

FOREIGN PATENT DOCUMENTS

| | | |
|---|---|---|
| 3509831 | 3/1986 | Fed. Rep. of Germany . |
| 1595740 | 7/1970 | France . |
| 2318383 | 2/1977 | France . |
| 2424157 | 11/1979 | France . |
| 2609763 | 7/1988 | France ................. 362/66 |

*Primary Examiner*—Stephen F. Husar
*Assistant Examiner*—Peggy Neils
*Attorney, Agent, or Firm*—Wenderoth, Lind & Ponack

[57] ABSTRACT

An optical assembly, especially for an automobile vehicle, is fixed and pivoted on a support by a screw threaded in the support and carrying a ball at its free end. The ball engages in a socket mounted in a housing fixed to the optical assembly. According to the invention, the socket is moulded from plastics material and comprises two parts connected by a live hinge disposed substantially in line with the center of the concave seating. After assembly the socket is fitted into a sleeve in the housing, which prevents opening of the hinge.

18 Claims, 1 Drawing Sheet

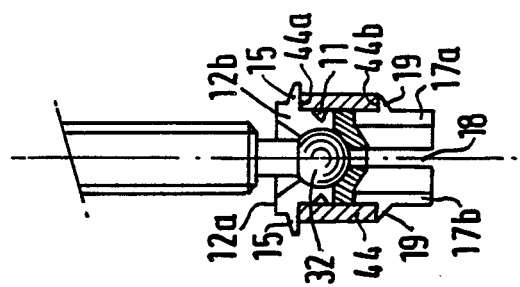
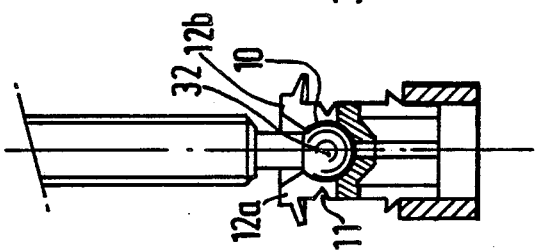
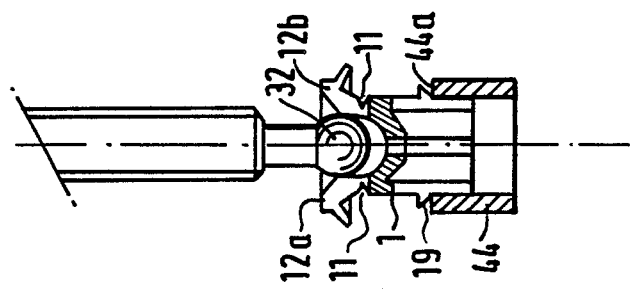
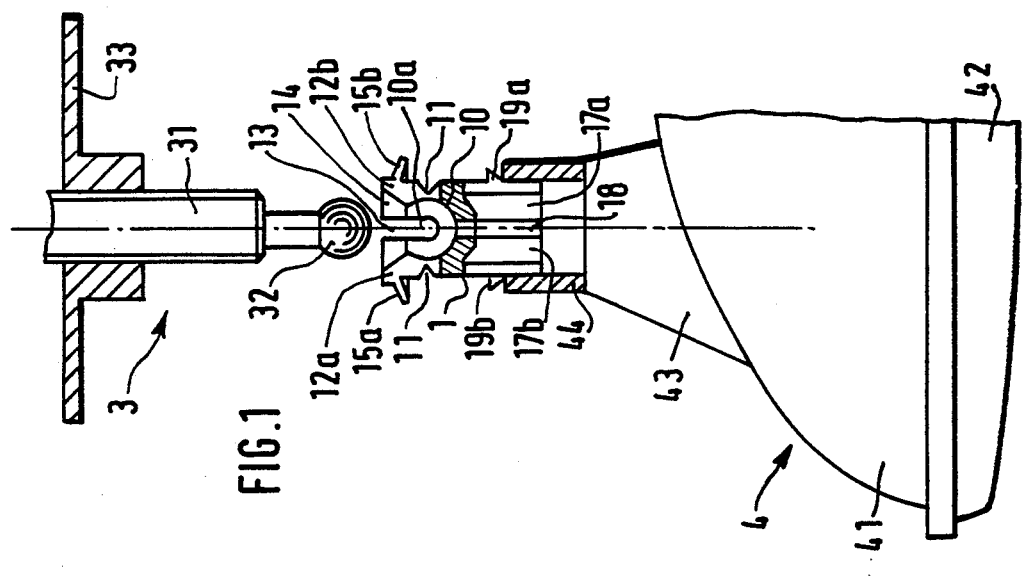

UNIT FOR FIXING AND PIVOTING AN OPTICAL ASSEMBLY

FIELD OF THE INVENTION

The present invention relates to a unit for fixing and pivoting, especially for fixing and pivoting a device for controlling an optical assembly such as the headlamp of an automobile vehicle.

BACKGROUND OF THE INVENTION

Such a control device, described for example in French Patent Application No. FR-2 424 157, is usually constituted by a control screw, received in a support fixed to the vehicle and comprising at one of its ends an element intended for pivoting, such as a ball for example. A socket integral with the optical assembly comprises a cavity adapted to house and fix in translation the pivoting element, whilst enabling it to rotate freely, in such a way as to form an assembly integral with the control screw.

The socket, which is often made of plastic, has a certain elasticity for enabling the pivoting element to be force fitted into it. Such a device is of simple design and satisfies the functional requirements, but has the disadvantage of being easily uncoupled.

In practice, such a mounting for the optical assembly, which is performed from the outside of the vehicle by presenting it in a direction parallel to the axis of the vehicle and in the front-to-rear direction, and engaging by force the pivoting elements by force in the sockets adapted to receive them, does not prevent accidental uncoupling or, in the case of a badly designed optical assembly, pulling it from the outside to disengage the pivoting elements from the sockets.

SUMMARY OF THE INVENTION

The present invention overcomes these disadvantages by providing a device of simple design which prevents the dislodging of the optical assembly, and for this purpose comprises a unit for fixing and pivoting, especially for a control device of an optical assembly such as a headlamp of an automobile vehicle, relative to a fixed support such as an intermediary plate or casing, which unit is adapted to receive a ball, fastened to or integral with a control screw of the fixed support, which is adapted to engage in a concave seating of a socket of generally cylindrical shape received within a corresponding housing of the optical assembly, characterized in that the socket comprises a moulding of plastics material constituted by two parts connected by a live hinge situated substantially in line with the center of the concave seating.

The following description shows one embodiment of the invention by way of example, with reference to the attached drawings.

DESCRIPTION OF THE DRAWINGS

FIG. 1 shows a unit, according to the invention, for fixing and pivoting an optical assembly, before mounting;
FIG. 2 shows the first phase of mounting;
FIG. 3 shows the second phase of mounting; and
FIG. 4 shows the third phase of mounting.

DESCRIPTION OF THE PREFERRED EMBODIMENT

FIG. 1 shows an optical assembly 4 comprising a reflector 41 closed by a glass 42. A fixing lug 43 connected to the reflector 41, or made integrally therewith, terminates in a tubular housing 44, in the present case open at both ends, which is adapted to receive a socket 1 of substantially cylindrical shape and having the same diameter as the internal diameter of the tubular housing 44. A control screw 3, comprising a threaded part 31, screws into a support 33 fixed to the vehicle on which the optical assembly 4 is mounted, and terminates in a ball 32, integral with the end of the control screw 3, and directed towards the optical assembly 4. The other end (not shown) of the control screw 3 is fitted with a knurled wheel, a slot, or any other means facilitating its operation.

Socket 1, shown in transverse section, is obtained by moulding from plastics material and is of generally cylindrical shape, having a concave seating 10 corresponding to the shape of the ball 32 and adapted to receive the latter. A live hinge 11, i.e. a hinge formed by a thin band of plastics material integral with the socket, extends around the circumference of the socket 1, substantially in line with the center 10a of the concave seating 10, and connects and delimits two constituent parts of the socket 1.

The first part of socket 1, adapted to receive the ball 32, is constituted by four arms 12a, 12b) separated from one another by slots 13; the internal walls of the arms are concave so that together they form the open part of the concave seating 10, being automatically extended by an introductory zone 14, and having an approximately truncated cone shape to enable, after mounting, an angular displacement of socket 1 relative to the control screw 3 and to facilitate its engagement in the socket 1. Each of the arms (12a, 12b) pivots around the live hinge 11 extending in a curved trajectory on the external wall of each of the arms (12a, 12b). An elastic bearing plane 15 in the form of a circular flange is constituted by sectors of a circle 15a, 15b having a greater diameter than the external diameter of socket 1 and sloping towards the front of the optical assembly 4 at an angle of less than 90°. The sectors of a circle 15a, 15b are made from the material at the free ends of the arms (12a, 12b). It is obvious that in other embodiments of the invention, the number of arms (12a, 12b) of the first cylindrical part may be two, three, four or more.

The second part of socket 1, delimited from the first by the live hinge 11, is constituted by four longitudinal arms 17a, 17b separated from one another by slots 18 extending as far as the end of the socket 1 directed towards the reflector 41. The arms 17a, 17b are inscribed in a circle having a diameter identical to that of the first part and corresponding to that of the housing 44. A second bearing plane 19a, 19b is formed on each of the arms 17a, 17b respectively, from its material, so as to form a second rigid circular flange 19, constituted by four sectors 19a, 19b having a diameter greater than that of socket 1 and separated from the first circular flange 15 by at least the length of the housing 44.

The different phases of mounting the optical assembly 4 will now be described with reference to FIGS. 2 to 4.

According to FIG. 2, the socket 1 is partially engaged in the housing 44 of the optical assembly, which is adapted to receive it in such a way that the second circular flange 19 becomes level with an edge 44a of the housing 44. During the introduction of the ball 32 into socket 1, the arms 12a, 12b of the first part of socket 1 move freely out of the way by pivoting around the live hinge 11, and regain their initial shape when the ball is inserted in the concave seating 10. This is helped by the design of the hinge 11 which extends in a curved trajectory (FIG. 3).

After the ball 32 is inserted into the concave seating 10 of socket 1, the housing 44, integral with the optical assembly 4, is translated in such a way that the circular flange 19 extends into the housing 44. In order for this to happen, the sectors 17a, 17b retract towards one another, due to the slots 18 and the elasticity of the plastic material, until the circular flange 19 projects from the other side of the housing 44, whilst regaining its initial shape and coming to bear on an edge 44b. The sectors 17a, 17b then resume their initial position (FIG. 4). The first and second circular flanges 15 and 19 being separated by an amount approximately the same as and at least equal to the length of the housing 44, the first circular flange 15, sloped towards the second circular flange 19 at an angle of less than 90°, bears elastically on the edge 44a of the housing, thus fixing the socket 1 in the housing 44.

The live hinge 11 being disposed between the circular flanges 15 and 19, in line with the center 10a of the seating 10, the arms 12a, 12b are thus imprisoned effectively in the housing 44 and cannot separate to free the ball 32, which is then entirely integral in translation with the optical assembly 4.

According to another arrangement, more particularly for mounting on an automatic assembly line, the socket 1 is previously engaged on the ball 32 to form with it a sub-assembly which is then presented in front of the housing 44 of the optical assembly 4.

The description given here is by way of example only, and modifications may be made to it without departing from the spirit of the invention.

What is claimed is:

1. A unit for fixing and pivoting an optical assembly to a control screw held by a fixed support, the control screw having a ball, and said unit comprising:
a socket moulded from plastics material and having a concave seat adapted to receive the ball of the screw, said socket comprising a first part having a plurality of arms, each said arm having a concave internal shape, said arms extending substantially in the direction of and around the longitudinal axis of said socket, and each said arm separated from an adjacent said arm by a slot extending substantially in the direction of said longitudinal axis, and a second part, said first and said second parts connected by a live hinge, said arms of said first part pivoting about said live hinge, and said second part having a substantially cylindrical formation connected to said second part of said socket, and said substantially cylindrical formation being adapted to connect to the optical assembly.

2. The unit as set forth in claim 1, wherein:
said live hinge is substantially annular and extends about said longitudinal axis of said socket.

3. The unit as set forth in claim 2, wherein said live hinge comprises a portion of said moulded plastics material socket smaller in thickness than said arms of said first part.

4. The unit as set forth in claim 1, wherein:
said live hinge comprises a portion of said moulded plastics material socket smaller in thickness than said arms of said first part.

5. The unit as set forth in claim 1. and further comprising:
a first external peripheral bearing on said first part and a second external peripheral bearing on said second part, said peripheral bearings positioned from each other a predetermined distance and having said live hinge therebetween.

6. The unit as set forth in claim 5, wherein:
said first external peripheral bearing comprises circular sectors integral with respective said arms of said first part and disposed at the free ends of said respective arms, said circular sectors constituting a substantially circular flange having a diameter greater than the external diameter of said socket and inclined toward said second external peripheral bearing.

7. The unit as set forth in claim 1, wherein said first and second part of said socket have substantially identical external diameters.

8. The unit as set forth in claim 1, wherein said arms are outwardly extended at their respective free ends, said arms together having an entry zone for the ball of the screw at said free ends shaped substantially as a truncated cone.

9. In a headlamp assembly for an automotive vehicle having a control screw held by a fixed support, said control screw having a connecting ball, a unit for fixing and pivoting said head lamp assembly to said control screw comprising:
a socket moulded from plastics material and having a concave seat adapted to receive said ball of said screw, said socket comprising a first part having a plurality of arms, each said arm having a concave internal shape, said arms extending substantially in the direction of and around the longitudinal axis of said socket, and each said arm separated from an adjacent said arm by a slot in said first part of said socket extending substantially in the direction of said longitudinal axis, and a second part, said first and said second parts connected by a live hinge, said arms of said first part pivotable about said live hinge, and said second part having a substantially cylindrical formation connected to said second part of said socket;
wherein said head lamp assembly includes a housing and said substantially cylindrical formation is adapted to fit into said housing to connect said socket to said head lamp assembly.

10. The unit as set forth in claim 9, wherein:
said live hinge is substantially annular and extends about said longitudinal axis of said socket.

11. The unit as set forth in claim 10, wherein:
said live hinge comprises a portion of said moulded plastics material socket smaller in thickness than said arms of said first part.

12. The unit as set forth in claim 9, wherein:
said live hinge comprises a portion of said moulded plastics material socket smaller in thickness than said arms of said first part.

13. The unit ass et forth in claim 9, wherein said housing is a cylindrical member on said head lamp assembly.

14. The unit as set forth in claim 13, wherein:
said substantially cylindrical formation is sized so as to have an outside diameter equal to the inside diameter of said housing on said head lamp assembly.

15. The unit as set forth in claim 13, and further comprising:
a first external peripheral bearing on said first part and a second said peripheral bearing on said second part, said peripheral bearings positioned from each other a distance at least equal to the length of said housing of said head lamp assembly and having said live hinge therebetween.

16. The unit as set forth in claim 15, wherein:
said first external peripheral bearing comprises circular sectors integral with respective said arms of said first part and disposed at the free ends of said respective arms, said circular sectors constituting a substantially circular flange having a diameter greater than the external diameter of said socket and inclined toward said second external peripheral bearing.

17. The unit as set forth in claim 9, wherein said first and second part of said socket have substantially identical external diameters.

18. The unit as set forth in claim 9, wherein:
said arms are outwardly extended at their respective free ends, said arms together having an entry zone for said ball of said screw at said free ends, said entry zone shaped substantially as a truncated cone.

* * * * *